US012705163B2

(12) United States Patent
Ovchinnikov et al.

(10) Patent No.: US 12,705,163 B2
(45) Date of Patent: Aug. 11, 2026

(54) VALIDATION OF REST API BACKWARD COMPATIBILITY WITH DIFFERENTIAL COVERAGE-GUIDED FEEDBACK FUZZING

(71) Applicant: CloudBlue LLC, Irvine, CA (US)

(72) Inventors: Sergei A. Ovchinnikov, Barcelona (ES); Pavel v. Lonkin, Barcelona (ES)

(73) Assignee: CloudBlue LLC, Irvine, CA (US)

( * ) Notice: Subject to any disclaimer, the term of this patent is extended or adjusted under 35 U.S.C. 154(b) by 1060 days.

(21) Appl. No.: 17/694,565

(22) Filed: Mar. 14, 2022

(65) Prior Publication Data

US 2023/0289635 A1 Sep. 14, 2023

(51) Int. Cl.
*G06F 11/3668* (2025.01)

(52) U.S. Cl.
CPC ................................ *G06F 11/3676* (2013.01)

(58) Field of Classification Search
CPC ........................... G06F 11/3676; Y10S 706/90
See application file for complete search history.

(56) References Cited

U.S. PATENT DOCUMENTS 8,745,592 B1 * 6/2014 Ormandy ............ G06F 11/3676 717/124
11,102,104 B1 * 8/2021 Pepper .................... H04L 1/241
2010/0058295 A1 * 3/2010 Johnson .............. G06F 11/3676 717/124
2014/0351793 A1 * 11/2014 Bartley ............... G06F 11/3676 717/124
2022/0138080 A1 * 5/2022 Sarkar ................. G06F 11/3688 717/126
2023/0100142 A1 * 3/2023 Karimibiuki ....... G06F 16/2468 726/25
2023/0146443 A1 * 5/2023 Huth .................. G06F 11/3644 717/127

FOREIGN PATENT DOCUMENTS

EP 3657336 A1 * 5/2020

* cited by examiner

*Primary Examiner* — Ziaul A Chowdhury
(74) *Attorney, Agent, or Firm* — Ice Miller LLP

(57) ABSTRACT

Differential coverage-guided feedback (CGF) fuzzing system and methods are provided to identify regressions in a software application. A computing device is configured to execute instructions that perform a fuzzing iteration. The fuzzing iteration includes operations that generate input data based on an initial corpus of samples; communicate the input data to a first application such that the first application performs operations utilizing the input data; collect first coverage information from the first application to identify first regressions; communicate the input data to a second application such that the second application performs operations utilizing the input data; and collect second coverage information from the first application to identify second regressions. The instructions additionally include: compare the first coverage information and the second coverage information; and perform another fuzzing iteration, wherein the computing device is configured to execute instructions that generate input data based on the compared first and second coverage information.

20 Claims, 7 Drawing Sheets

100

200

300

VALIDATION OF REST API BACKWARD COMPATIBILITY WITH DIFFERENTIAL COVERAGE-GUIDED FEEDBACK FUZZING

TECHNICAL FIELD

This disclosure relates generally to the field of digital data processing systems and data processing methods. In particular, a data processing method and system are provided for automated discovery of errors and flaws in software, operating systems and/or networks.

BACKGROUND

Fuzz testing (fuzzing) is a quality assurance technique used to discover coding errors and security loopholes in software, operating systems and/or networks. It involves inputting substantial amounts of random data (i.e., "fuzz"), to a test subject with the goal of generating coding errors, security loopholes, and the like, for discovery.

BRIEF SUMMARY OF THE INVENTION

Embodiments described herein improve regressions identified during software testing. Additionally, the cost and complexity of resources involved can be improved. According to some embodiments, differential coverage-guided feedback (CGF) fuzzing systems and methods identify regressions in a software application. In some embodiments, a computing device is configured to execute instructions that perform a fuzzing iteration. The fuzzing iteration includes operations that generate input data based on an initial corpus of samples; communicate the input data to a first application such that the first application performs operations utilizing the input data; collect first coverage information from the first application to identify first regressions; communicate the input data to a second application such that the second application performs operations utilizing the input data; and collect second coverage information from the second application to identify second regressions. The instructions additionally include comparing the first coverage information and the second coverage information, and performing another fuzzing iteration, wherein the computing device is configured to execute instructions that generate input data based on the compared first and second coverage information.

A fuzzer (i.e., a fuzzing module of a computing device) first performs a fuzzing operation to generate input data based on an initial corpus of samples (if provided). Software applications are executed utilizing the initial input data. Coverages can be collected associated with two or more applications based on output data of the applications. A compare module can be configured to then compare return values applications. In some embodiments, the applications can correspond to two or more versions of an Application Programming Interfaces (API), such as two or more versions of a Representation State Transfer (REST) API. If the return values are the same (i.e., equal) then the fuzzer can commence a new iteration by generating new input data, and the process is repeated. Otherwise, new regressions are indicated, and information is collected about the regressions. For example, the associated input data, differences between responses and failures, errors in the internal logic of both APIs can be collected. Some or all of this collected information can be provided as feedback to perform a future iteration.

Differential CGF fuzzing can achieve advantages not satisfied by conventional fuzzing systems, including improving regressions exposed, conserving time and resources involved in fuzz-testing. Such advantages can also permit automatic testing based on infinite test sets for validation of backward compatibility, automatically covering and testing of third party components used by developers, reducing the number of duplicated runs against the same code branches, extendable and easy supported test sets, and in validating backward compatibility of an application as a white box.

BRIEF DESCRIPTION OF THE DRAWINGS/FIGURES

DETAILED DESCRIPTION OF THE INVENTION

Figure 1A:
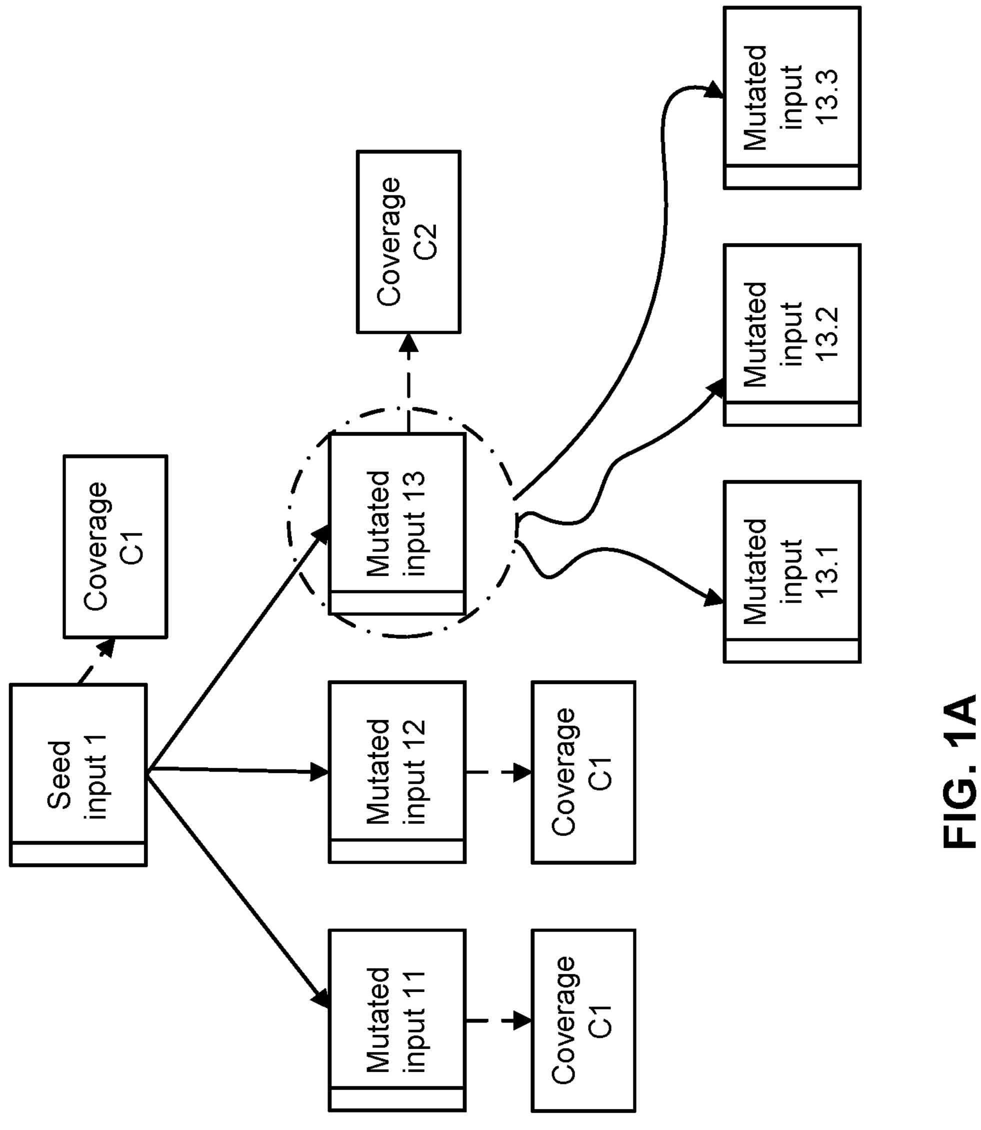
FIG. 1A depicts a fuzzing (i.e., fuzz-testing) methodology, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Software applications, such as REST APIs, can communicate between different internal components inside one solution and can perform integrations between business-to-business (B2B) solutions, such as Software-as-a-Service (SaaS), Infrastructure as a service (IaaS), Anything-as-a-service (XaaS), etc. Over a period of time, a REST API interface may change and providing backward compatibility between different versions of REST APIs becomes essential. Backward compatibility guarantees integrations comply between different versions of interfaces. Validation of backward compatibility between different versions can be a complex and laborious technical issue during a product's lifecycle.

One of the ways to resolve the issue about validation of the backward compatibility of the new, modified version of the REST API is to launch a set of functional and end-to-end (e2e) tests. Before delivering to production, the set of tests from an earlier API version is executed against a new version. In the case of "green" (without failures) build, the new version of API can be accepted as having backward compatibility. For understanding the quality of the test set the coverage metric is used. In the software industry, code coverage of more than 80% is considered sufficient. But this method of validation of backward compatibility has several shortcomings.

A primary problem exists in that the number of tests provided by developers is likely to be finite. Since all tests are written by developers and are focused on covering certain business scenarios, the number of these tests is a finite set. And since this set is finite, it only covers finite branches of code execution. A second problem exists in that tests written by developers may inaccurately imply or assume that third party components are correct. Thus, a developer may fail to provide tests for involving third party components, such as libraries that may contain errors. Thus, even for perfect code coverage, shortfalls may be encountered in identifying complete coverage data as it relates to the entirety of the system.

Some of these problems may be resolved using differential fuzzing. However, differential fuzzing utilizes a black-box testing approach against software applications, including applications involving a REST API. The black-box approach doesn't provide additional information to the fuzzer on how to effectively generate random input data. Due to inefficient input data may require extra time and resources to be consumed during the development process or may not expose a sufficient number of regressions.

According to some embodiments, both approaches (Differential Fuzzing and Coverage-Guided Feedback Fuzzing) are implemented in a novel system and methodology for validation of the backward compatibility of REST APIs. The differential CGF fuzzing system and methodology enables automatic, infinite test sets for validation of the backward compatibility of software, such as a REST API. The differential CGF fuzzing system and methodology enables automatic coverage and testing of a whole system, including third party components (e.g., libraries) used by developers.

As noted above, differential CGF fuzzing can achieve advantages not satisfied by conventional fuzzing systems, including improving regressions exposed, conserving time and resources involved in fuzz-testing, reducing the number of duplicated runs against the same code branches, extendable and easy supported test sets, and in validating backward compatibility of an application as a white box.

Fuzzing

Fuzzing is a testing technique to analyze software, which can be automatic (i.e., at least semiautomatic). It is to provide to the application as input incorrect, unexpected, or randomly generated data. Failures, freezes, errors in the internal logic, memory leaks caused by different sets of input data can be identified through such methods. Fuzzing as a testing technique permits a large, or even infinite, number of test sets.

FIG. 1A illustrates fuzzing by mutating inputs to an application, such as software code, an operating system, or the like. Referring to FIG. 1A, a coverage refers to portions, such as lines of code, operations, etc., of a software application (not shown) that are executed when a particular input is provided for processing by the application. As shown in FIG. 1A, seed input 1 may be associated with a coverage C1. That is, portion C1 of the software application is executed when seed input is processed, and output data of the software application may be based on this coverage. According to some embodiments, a fuzzer mutates seed input 1 to generate mutated inputs 11, 12, and 13. Mutated inputs 11 and 12 may not expose new coverage (e.g., regressions) but instead may be similarly associated with coverage C1. However, mutated input 13 may be associated with new coverage/regression(s) C2. Therefore, in a fuzzing system and methodology, mutated input 13 may be collected along with the associated coverage, to utilize in a future fuzzing analysis. For example, mutated input 13 can be further mutated in a next iteration to generate mutated inputs 13.*a*, 13.2, and 13.3. The software application may be executed again utilizing these newly mutated inputs and the coverages can be analyzed and compared to identify further candidates to be mutated in the next iteration, and so on.

Figure 1B:
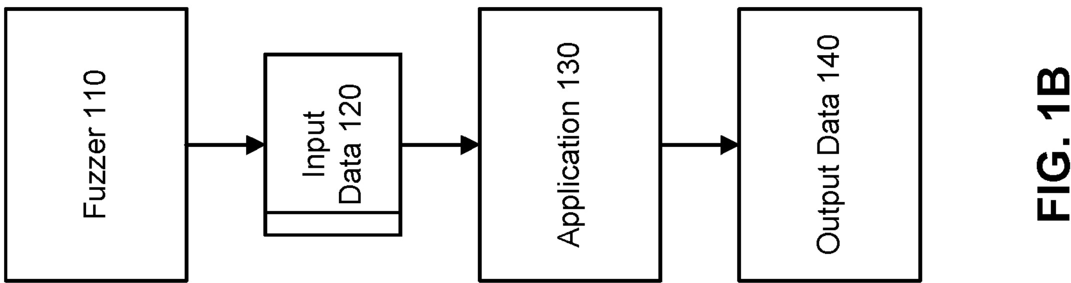
FIG. 1B depicts a fuzzing system, according to some embodiments.

Referring to FIG. 1B, fuzzing system 100 can include a fuzzer 110 configured to generate input data 120 and run an application 130 utilizing the generated input data 120. Fuzzing system 100 can receive output data 140 from application 130, based on the generated input data. Generally, coverages can be collected associated with application 130 based on output data 140. Some or all of this collected information can be utilized to identify regressions corresponding with application 130. A fuzzer such as fuzzer 110 may utilize one or more approaches to mutate input data, as described in embodiments provided below.

Coverage-Guided Feedback Fuzzing

Randomly generated input data are not often effective for testing, because it leads to duplication of executions of the same branches in the code. Instead, or in addition to random input data, mutating of input data can be performed to achieve efficiency during fuzzing based on the coverage of the executed code.

Figure 2:
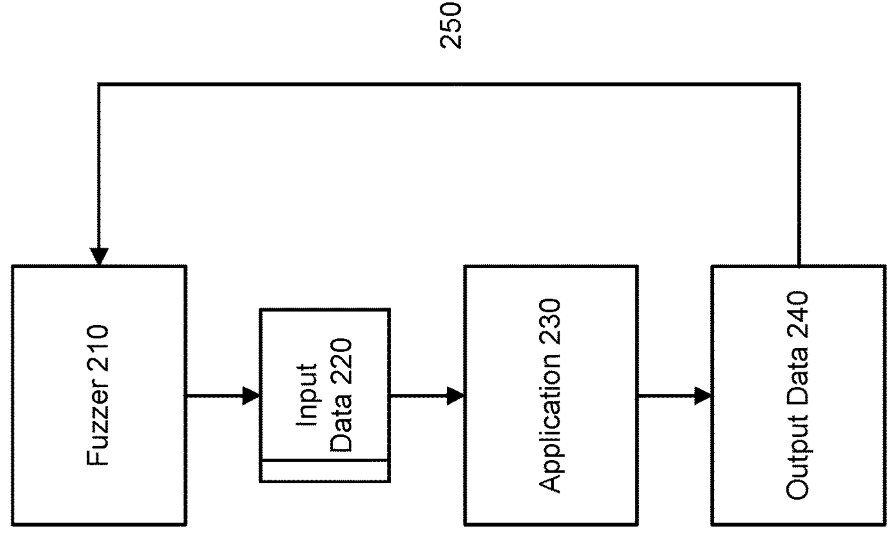
FIG. 2 is an illustration of a coverage-guided feedback fuzzing system, according to some embodiments.

FIG. 2 illustrates a coverage-guided feedback (CGF) fuzzing system 200 for automated discovery of errors in software, operating systems and/or networks. A product of interest can include a good or merchandise. Fuzzing is used for detecting violations of internal logic and checks in the code for two or more components that perform the same or similar operation. CGF fuzzing system 200 automatically detects an incorrect function of the application by providing specially generated input data, but also by comparing the output from the second component using the same generated by fuzzer input data.

Referring to FIG. 2, CGF fuzzing system 200 is provided to test for software errors. In one non-limiting example, CGF fuzzing system 200 can include fuzzer 210, which can be a module incorporated in a computing device and configured to generate input data 220. Continuing in this example, CGF fuzzing system 200 input data 220 can be provided as inputs to application 230. Application 230 can be, for example, software code such as different versions of a software application (e.g., validation library). In some embodiments, application 230 can include, for example, software code configured to perform an API, such as a REST API.

CGF fuzzing system 200 is configured to run application 230 utilizing input data 220 to generate output data 240. First output data 240 can include information about errors (e.g., logic violations, vulnerabilities, etc.) that was uncovered during fuzz testing of application 230.

CGF fuzzing system 200 can rely on a corpus of sample inputs for the code under test. This corpus should be seeded with a variety of possible inputs for tested code. Based on the samples of the current corpus fuzzer generates random mutations for input data. The initial corpus can be generated by random but will lead to increasing the execution time. If mutated input data triggers execution of some uncovered branch in code, this input data will be added to current corpus samples for future analyses and mutations. This approach can reduce the time and resources necessary for testing. Also, this allows automatically covering third party components and libraries.

A fuzzer may utilize one or more approaches to mutate input data. For example, in some embodiments, fuzzer 210 may: replace of bytes with some random bytes (1 . . . n), copy random range of bytes and add it to the beginning/end of the input, remove N bytes from the beginning/end of the input, invert some number of random bits, etc. A person of ordinary skill in the art may add supplementary or custom mutators to the fuzzer, based on their own specific logic of input data.

For example, an application pseudo-code to be analyzed utilizing fuzzing (i.e., fuzz-testing) may include set of commands:

```
# import library function for two level domains validation
From two_level_domain_validator_lib import validate_level_two
# import library for three level domains validation
from three_level_domain_validator_lib import validate_level_three
#validation function for fuzzer
def is_valid_domain (domain:str) :
  domain_parts = domain.split ('.')
  domain_level = len (domain_parts)
  if domain_level = = 1:
    # for cases, when input strong doesn't contain '.' -
  always return invalid
    Return false
  elif domain_level = = 2
    # for two level domains = use library
    return validate_level_two (domain)
  elif domain_level = = 3
    # for three level domains = use library
    return validate_level_three (domain)
  # other domains are valid only if have '. com' as the root
    Return 'com' = =domain_parts [−1]
```

During iterating through the test procedure, the fuzzer may mutate one or more corpuses included in input data. For example, the fuzzer may be provided with the following corpus: “guided.codecoverage.example.com” as an input. On a first iteration, the fuzzer may simply execute the initial corpus and collect coverage. The code coverage may reach execution of code, such as the clause “if domain_level==1:” and return the associated value. At this level, only a first portion of the software code is executed and regressions such as logical errors, coding flaws, and the like, are not yet exposed in the remainder of the code.

Continuing this example, in a next phase the fuzzer randomly removes the last two levels of the string, such that on this iteration the mutated input data looks like: “example-.com.” After execution of the second iteration, the coverage will include new lines, i.e., execution of the external library function validate_level_two. The provided sample in this coverage will be added to the corpus of samples and used for future mutations. Step by step, the fuzzer will randomly generates test samples to apply to the code until it fails.

Also, since coverage can be tracked for used third-party libraries (in our example two_level_domain_validator_lib and three_level_domain_validator_lib) corpus of samples will contain samples for branches for these libraries too. Thus, fuzzer 210 is configured to test and tracks third-party libraries utilizing a CGF fuzzing methodology.

Differential Fuzzing

Figure 3:
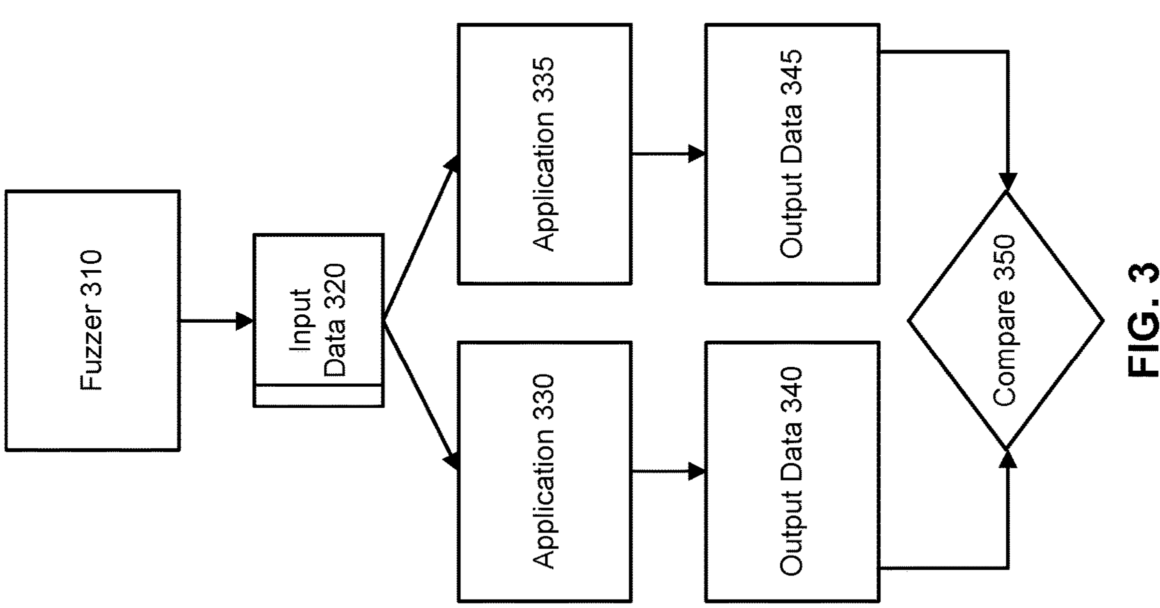
FIG. 3 is an illustration of a differential fuzzing system, according to some embodiments.

FIG. 3 illustrates a differential fuzzing system 300 for automated discovery of errors in software, operating systems and/or networks. As described above, fuzzing is used for detecting violations of internal logic and checks in the code for two or more components that perform the same or similar operation. Differential fuzzing system 300 automatically detects an incorrect function of the application by providing specially generated input data, but also by comparing the output from the second component using the same generated by fuzzer input data. A differential fuzzing methodology implemented by differential fuzzing system 300 can have advantages, for example, in testing different versions of a software application and/or two different clients interacting with the software application.

Referring to FIG. 3, differential fuzzing system 300 is provided to test for software errors. In one non-limiting example, differential fuzzing system 300 for automated discovery of errors can include fuzzer 310, which can be a module incorporated in a computing device and configured to generate input data 320. Continuing in this example, differential fuzzing system 300 input data 320 can be provided as inputs to first application 330 and second application 335, respectively. First application 330 and second application 335 can be, for example, software code such as different versions of a software application (e.g., validation library). In some embodiments, first application 330 and second application 335 can include, for example, software code configured to function as an API, such as a REST API.

Differential fuzzing system 300 is configured to run first application 330 utilizing input data 320 to generate first output data 340, and to run second application 335 utilizing input data 320 to generate second output data 345. First output data 340 can include information about errors (e.g., logic violations, vulnerabilities, etc.) that were uncovered during fuzz testing of first application 330, second output data 345 can include information about errors that were uncovered during fuzz testing of first application 335. According to some embodiments, differential fuzzing system can include a compare module 350 configured to determine whether first output data 340 and second output data 345 contain identical return values or whether new coverages are exposed.

Differential Coverage-Guided Feedback Fuzzing

According to some embodiments, a novel validation system and methodology utilizes differential fuzzing and CGF Fuzzing for validation of the backward compatibility of software, such as REST APIs, utilizing compared output data to generate new mutations in the fuzzing system and methodology.

Figure 4:
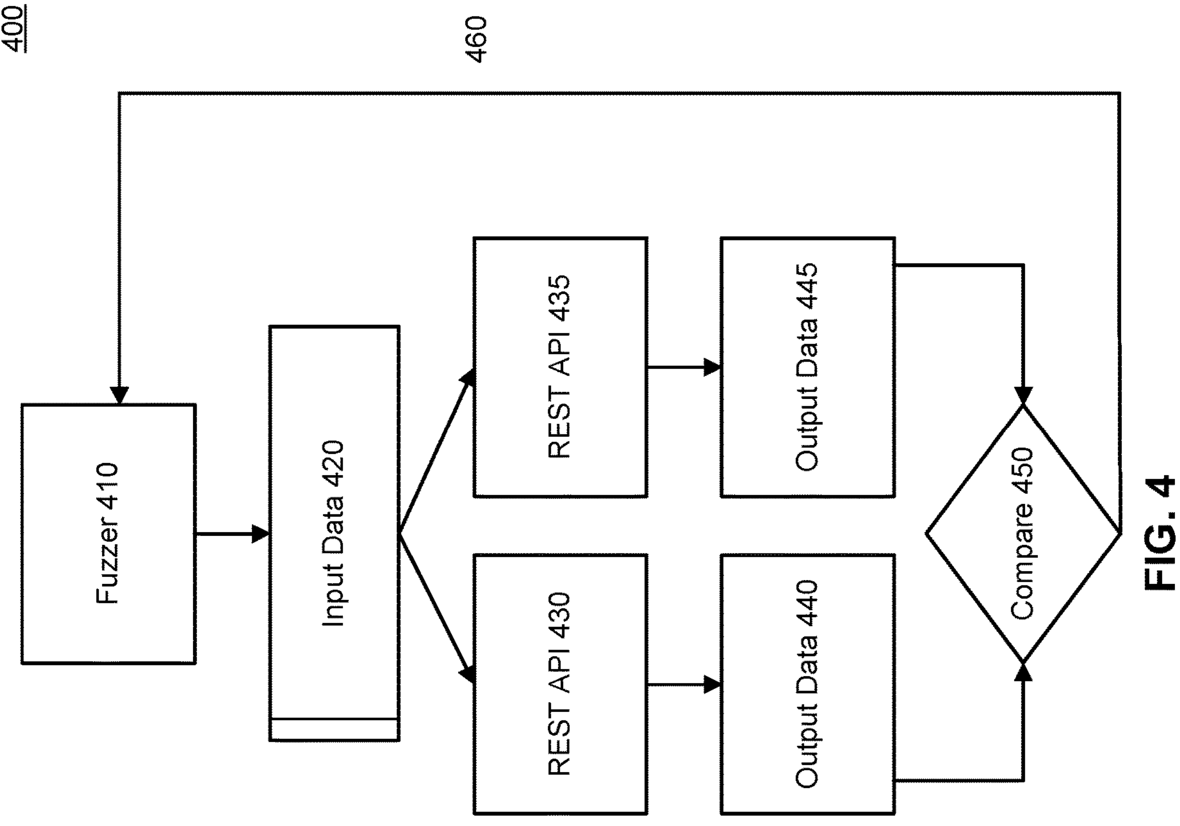
FIG. 4 is an illustration of a differential coverage-guided feedback fuzzing system, according to some embodiments.

FIG. 4 illustrates a differential CGF fuzzing system 400 for automated discovery of errors in software, operating systems and/or networks. Differential CGF fuzzing system 400 can be implemented utilizing embodiments of CGF fuzzing system 200 and differential fuzzing system 300. However, differential CGF fuzzing system 400 is distinct and advantageous beyond these individual systems in that differential CGF fuzzing system 400 can be configured to perform differential fuzzing while being provided feedback (e.g., by feedback loops 460) about new regressions and coverages during a testing process.

Referring to FIG. 4, differential CGF fuzzing system 400 is provided to test for software errors. In one non-limiting example, differential CGF fuzzing system 400 for automated discovery of errors can include fuzzer 410, which can be a module incorporated in a computing device and configured to generate input data 420. Differential fuzzing system 400 can provide input data 420 as a collection of data input(s) to first application 430 and second application 435. First application 430 and second application 435 can be, for example, software code such as different versions of a software application (e.g., validation library). In some embodiments, first application 430 and second application 435 can include, for example, software code configured to perform a REST API. More specifically, first application 430 and second application 435 can be different versions of the REST API.

Differential CGF fuzzing system 400 is configured to run first application 430 utilizing input data 420 to generate first output data 440, and to run second application 435 utilizing input data 420 to generate second output data 445. First output data 440 can include information about errors (e.g., logic violations, vulnerabilities, etc.) that were uncovered during fuzz testing of first application 430, and second output data 445 can include information about errors that were uncovered during fuzz testing of first application 435. Differential CGF fuzzing system 400 further includes compare module 450 to assess identify new regressions exposed during an iteration and to provide feedback 460 to fuzzer 410. Feedback 460 includes information about new coverages/regressions provided to fuzzer 410 for generating new mutated input data during a future iteration. By performing feedback at a level abstracted to fuzzer 410, which generates input data, for example, to both REST APIs 430 and 435 (e.g., different versions of a REST API), differential CGF fuzzing system 400 can expose greater coverage than performing fuzzing using either methodology individually, or based on rote combination.

In some embodiments, differential CGF fuzzing system 400 can be configured to perform iterations of testing until a certain quantity (e.g., a reference quantity) of coverages is achieved. For example, system 400 may perform iterations until 10, 100, 1000, or more coverages are identified. In some embodiments, system 400 can be configured to perform iterations for a certain period of time, such as a reference duration.

During operation, until the condition is achieved fuzzer 410 performs a series of steps, where fuzzer 410 commences by performing a fuzzing operation to generate input data based on an initial corpus of samples (if provided). REST API 430 (e.g., a first version of the REST API) and REST API 435 (e.g., a second version of the REST API) are executed utilizing the initial input data. Coverages can be collected associated with REST APIs 430 and 435, respectively, based on first and second output data 440 and 445. Compare module 450 can be configured to compare return values (HTTP status codes) of the two API versions (REST APIs 430 and 435). If the return values are the same (i.e., equal) then fuzzer 410 commences a new iteration by generating new input data, and the process is repeated. Otherwise, if the comparison indicates new regressions, information is collected about the regressions. For example, the associated input data, differences between responses and failures, errors in the internal logic of both APIs can be collected. Some or all of this collected information can be provided as feedback 460 to inform a next iteration. According to some embodiments when the condition is satisfied (e.g., reference coverage quantity is attained, time period is reached, etc.) the differential CGF fuzzing system 400 can terminate new iterations and the information collected at operation can be provided as an output to provide information about regressions. For example, a developer can review the information to inform a code debugging process.

REST APIs 430 and 435 are provided, as a non-limiting example of software for testing utilizing Differential CGF fuzzing system 400 and corresponding methodologies. The disclosed embodiment is not limited to REST APIs, and other software elements can be tested based on similar approach. For example, REST APIs 430 and 435 can be replaced by (or otherwise incorporate) third party components, libraries, other software modules, etc.

Differential CGF fuzzing system 400 achieves additional advantages not satisfied by conventional systems. Such advantages include permitting automatic testing based on infinite test sets for the validation of the backward compatibility of REST APIs, to automatically cover and test third party components used by developers, to extendable and easy supported test sets, to validate backward compatibility of the REST API as a white box, to reduce the number of duplicated runs against the same code branches, and to reduce time and resources in the developing process.

Figure 5:
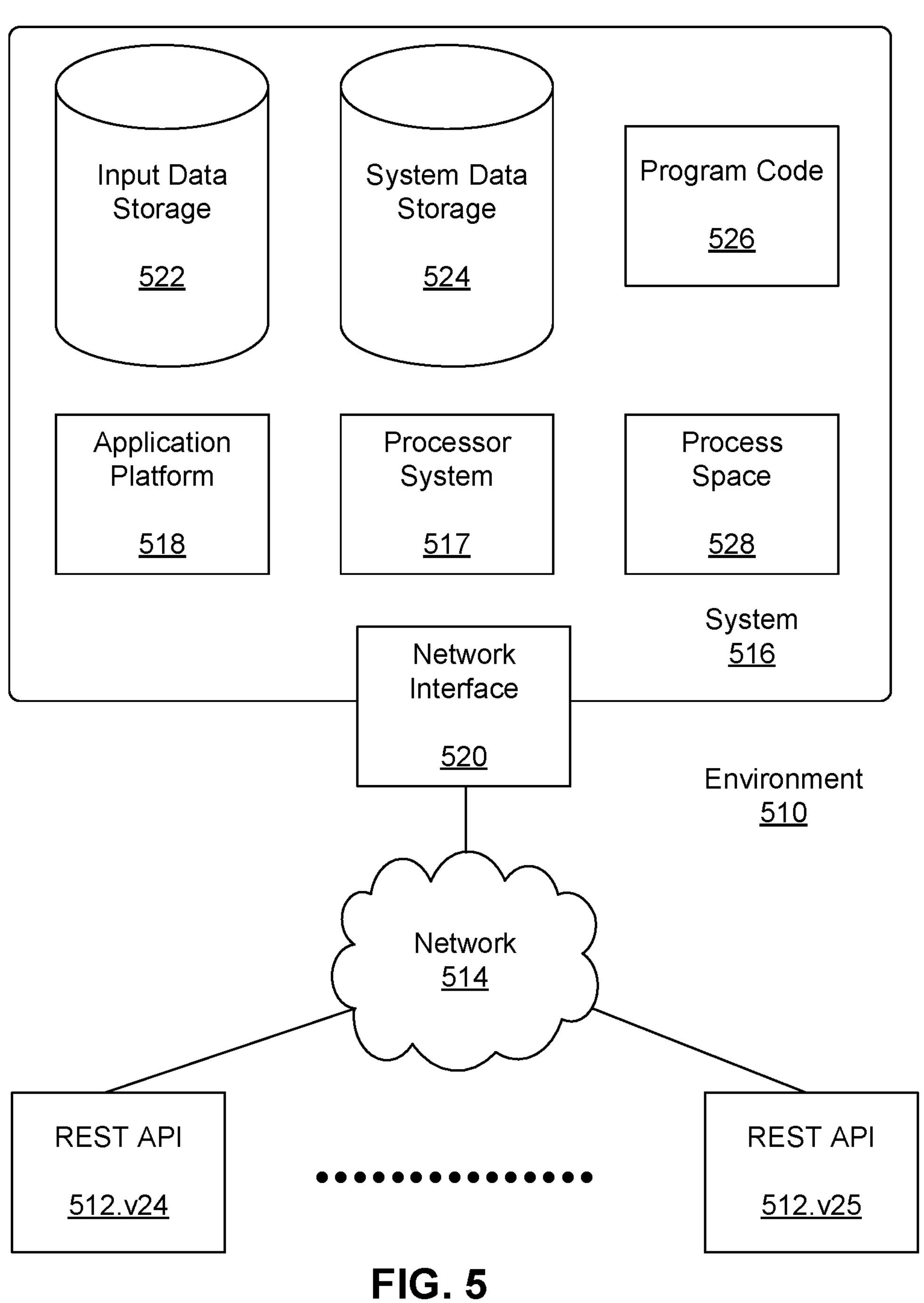
FIG. 5 is an example operating environment of a differential coverage-guided feedback fuzzing system, according to some embodiments.

FIG. 5 illustrates a block diagram of an environment 510 wherein a differential CGF fuzzing system might be used. The environment 510 may include REST APIs 512, a network 514, a system 516, a processor system 517, an application platform 518, a network interface 520, an input data storage 522, a system data storage 524, program code 526, and a process space 528. In some embodiments, environment 510 can represent a cloud environment, and application platform 518 can represent an application cloud platform, such as AMAZON WEB SERVICES (AWS), MICROSOFT AZURE, etc. In other embodiments, the environment 510 may not have all of the components listed and/or may have other elements instead of, or in addition to, those listed above. In this disclosure, a consumer may be synonymously referred to as a customer or patron.

The environment 510 is an environment in which a differential CGF fuzzing service exists. REST APIs 512 may be any machine or system that is used to perform integrations of disparate systems (e.g., SaaS, IaaS, Xaas applications, etc.). REST APIs 512 may include two or more versions (e.g., version 24 and 25) of a particular REST API. As illustrated in FIG. 5 the REST APIs 512 might interact via the network 514 with a differential CGF fuzzing service, which is the system 516.

A differential CGF fuzzing service, such as the system 516, can include a database system that is made available to users, such as developers, that do not need to necessarily be concerned with building and/or maintaining the database system, but instead may be available for their use when they need the database system (e.g., for testing REST APIs 512). For example, some on-demand database services may store information to be accessed during testing of one or more REST APIs. A database image may include one or more database objects. A relational database management system (RDMS) or the equivalent may execute storage and retrieval of information against the database object(s). The application platform 518 may be a framework that allows the applications of the system 516 to run, such as the hardware and/or software, e.g., the operating system. In an embodiment, the differential CGF fuzzing service 516 may include the application platform 518 which enables creation, managing and executing one or more applications developed by the provider of the on-demand database service, customers ordering through a merchant storefront via REST APIs 512, or third-party application developers accessing the on-demand database service via the REST APIs 512. System 516 can include one or more processes to generating input data, such as input data 1, 110, 210, etc., through which coverages and regressions can be exposed during testing.

The network 514 is any network or combination of networks of devices that communicate with one another. For example, the network 514 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The REST APIs 512 might communicate with the system 516 using TCP/IP and, at a higher network level, use other common Internet protocols to communicate, such as HTTP, FTP, AFS, WAP, etc. In an example where HTTP is used, the REST APIs 512 might include an HTTP client commonly referred to as a "browser" for sending and receiving HTTP messages to and from an HTTP server at the system 516. Such an HTTP server might be implemented as the sole network interface between the system 516 and the network 514, but other techniques might be used as well or instead. In some implementations, the interface between the system 516 and the network 514 includes load sharing functionality, such as round-robin HTTP request distributors to balance loads and distribute incoming HTTP requests evenly over a plurality of servers.

In one embodiment, the system 516, shown in FIG. 5, implements a differential CGF fuzzing system. For example, in one embodiment, the system 516 includes application servers configured to implement and execute differential CGF fuzzing software applications as well as provide related data, code, forms, webpages and other information to and from the REST APIs 512 and to store to, and retrieve from, a database system related data, objects, and order fulfillment content. With a differential CGF fuzzing system, data for multiple iterations of a fuzzing methodology may be stored in the same physical database object, to facilitate analytics processes to identify regressions/coverages that can be addressed by a developer during a testing process. For example, the system 516 may provide access to multiple hosted (standard and custom) applications, including a differential CGF fuzzing service application.

Several elements in the system shown in FIG. 5 include conventional, well-known elements that are explained only briefly here. For example, each of the REST APIs 512 could include a desktop personal computer, workstation, laptop, server, or any other computing device capable of interfacing directly or indirectly to the Internet or other network connection. For example, REST APIs 512 can access data and applications hosted by the system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the REST APIs 512 and all of its components are operator configurable using applications, such as a browser, including computer code run using a central processing unit. Similarly, the system 516 and all of the components might be operator configurable using application(s) including computer code to run using a central processing unit such as the processor system 517 a processor and/or multiple processor units. A computer program product embodiment includes a machine-readable storage medium (media) having instructions stored thereon/in which may be used to program a computer to perform any of the processes of the embodiments described herein. Computer code for operating and configuring the system 516 to intercommunicate and to process webpages, applications and other data and media content as described herein are, for example, downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

As generally described above, in some embodiments, process space 528 can execute differential CGF fuzzing service processes to implement various functions of the system 516, and the process space 528 for executing differential CGF fuzzing service processes, such as running applications as part of an application hosting service.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. In some differential CGF fuzzing database systems, standard entity tables might be provided for use by all REST APIs 512.

Figure 6:
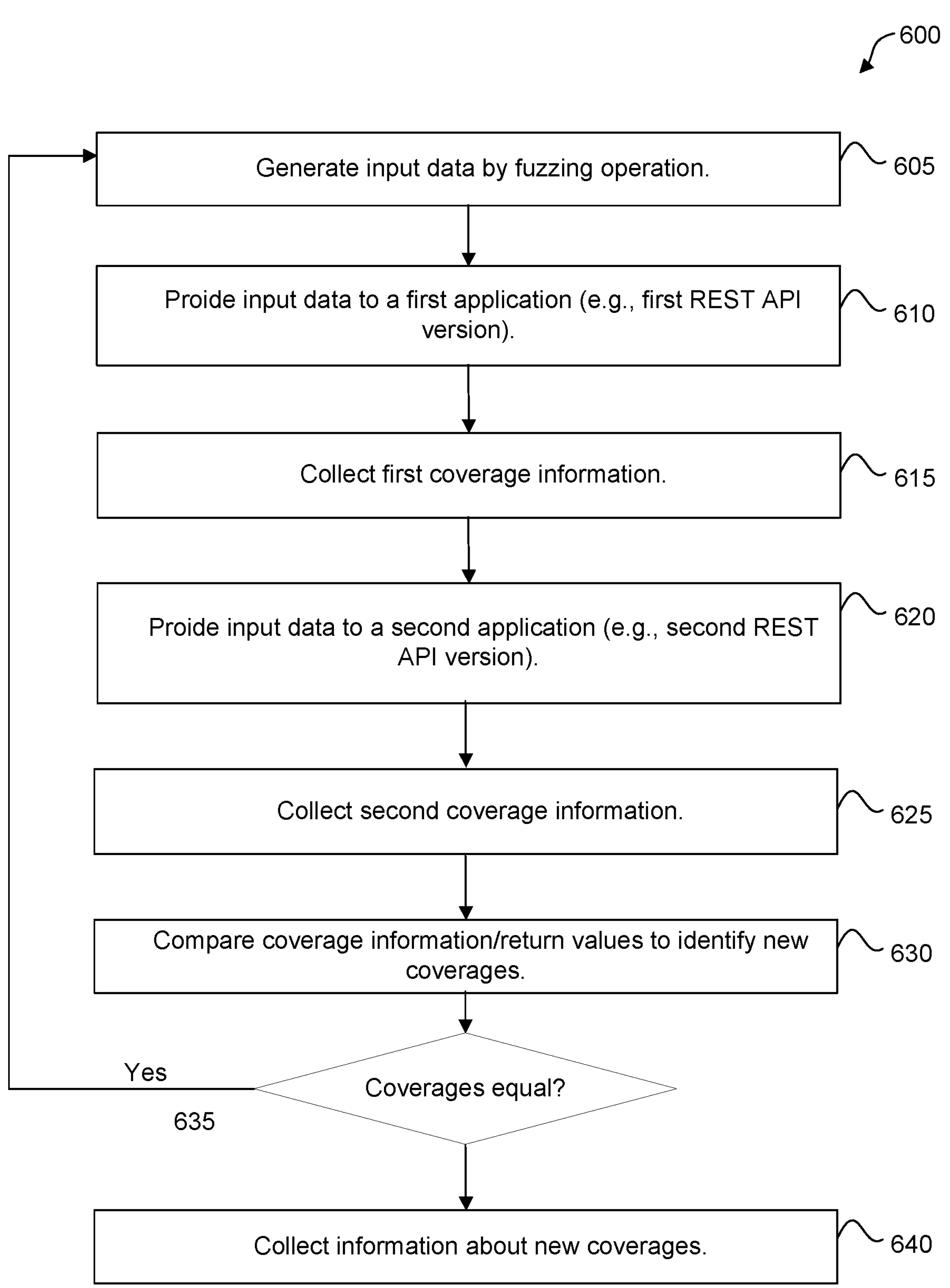
FIG. 6 is a flow diagram of a method for differential coverage-guided feedback fuzzing, according to some embodiments.

FIG. 6 is a flow diagram of a method 600 for performing differential CGF fuzzing, according to some embodiments of the present disclosure. In some embodiments, method 400 provides operational steps to identify regressions in two or more software applications (e.g., two or more versions of a REST API). In some embodiments, method 600 is performed by a computing device configured through a network to interact with two or more software applications, such as two or more versions of a REST API. According to some embodiments, the following operations may be performed while coverage of one or more REST API(s) are equal to or less than a required value (for example, the reference value may depend on Software Development Life Cycle (SDLC) requirements).

At operation 605, a fuzzing operation is performed to generate input data based on an initial corpus of samples (if provided), generates input data.

At operation 610, the computing device inputs the input data to a first REST API version such that the API v.1 performs operations utilizing the input data. At operation 615, the computing device collects coverage information to identify future mutations based on the REST API v.1 software code.

At operation 620, the computing device inputs the input data to REST API second version such that the API v.2 performs operations utilizing the same input data as provided to API v. 1 at operation 610. At operation 625, the computing device collects coverage information to identify future mutations based on the REST API v.2 software code. Operation 625 can include collecting return values received by the computing device from API v.2.

At operation 630, return values of the two versions of API can be compared to identify potential new coverages exposed during a current iteration. According to some embodiments, collected return values can include HTTP status codes received from one or both of the API v.1 and API v.2 software code.

At operation 635, if the comparison indicates that the return values are equal (i.e., no new regression is exposed) then method 600 may return (i.e., jump) to operation 605 to generate new input data for a next iteration, and the process can be repeated until the condition (e.g., maximum quantity of coverages) is satisfied.

At operation 640, if the comparison indicates new regressions, the computing device can collect information about the regressions/coverages. Operation 635 can include collecting the associated input data, difference between responses and failures, errors in the internal logic of both APIs. In some embodiments, after regression information is collected, operation 635 can proceed to return/jump to operation 605 to generate new input data for a next iteration.

According to some embodiments when a threshold coverage quantity is attained, the process 600 can terminate new iterations and the information collected at operation 640 can be output, for example to one or more developers, to provide information about regressions.

It should be understood that the operations shown in the exemplary methods are not exhaustive and that other operations can be performed as well before, after, or between any of the illustrated operations. In some embodiments of the present disclosure, the operations can be performed in a different order and/or vary.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for identifying regressions in a software application, comprising:
- performing a fuzzing iteration comprising:
  - generating input data based on an initial corpus of samples;
  - communicating the input data to a first application such that the first application performs operations utilizing the input data;
  - collecting first coverage information from the first application to identify first regressions;
  - communicating the input data to a second application such that the second application performs operations utilizing the input data; and
  - collecting second coverage information from the second application to identify second regressions;
- comparing the first coverage information and the second coverage information;
- and generating input data for another fuzzing iteration based on the compared first and second coverage information.

2. The method of claim 1, wherein the first application is a version of a Representation State Transfer (REST) Application Programming Interface (API) and the second application is another version of the REST API.

3. The method of claim 1, further comprising terminating a fuzzing iteration when a threshold coverage quantity is attained.

4. The method of claim 1, wherein the first coverage information and/or the second coverage information comprises one or more of the input data, differences between responses, and errors in the logic of one or more of the first and second applications.

5. The method of claim 1, storing the compared first and second coverage information as input data storage.

6. The method of claim 5, comprising providing the input data storage as feedback to a fuzzing module, wherein the fuzzing module generates additional input data based on the feedback.

7. A differential coverage-guided feedback (CGF) fuzzing system for identifying regressions in a software application, comprising:
- a computing device, comprising a processor and a communication module, wherein the computing device is configured to execute instructions that:

perform a fuzzing iteration to execute instructions that:

generate input data based on an initial corpus of samples;

communicate the input data to a first application such that the first application performs operations utilizing the input data;

collect first coverage information from the first application to identify first regressions;

communicate the input data to a second application such that the second application performs operations utilizing the input data; and collect second coverage information from the second application to identify second regressions;

compare the first coverage information and the second coverage information; and perform another fuzzing iteration, wherein the computing device is configured to execute instructions that generate input data based on the compared first and second coverage information.

8. The system of claim 7, wherein the first application is a version of a Representation State Transfer (REST) Application Programming Interface (API) and the second application is another version of the REST API.

9. The system of claim 7, wherein the computing device is further configured to execute instructions to terminate a fuzzing iteration when a threshold coverage quantity is attained.

10. The system of claim 7, wherein the first coverage information and/or the second coverage information comprises one or more of the input data, differences between responses, and errors in the logic of one or more of the first and second applications.

11. The system of claim 7, wherein the computing device comprises a fuzzing module, wherein fuzzing module generates the input data.

12. The system of claim 7, wherein the computing device stores the compared first and second coverage information as input data storage.

13. The system of claim 7, wherein the computing device outputs at least a portion of the compared first coverage information and second coverage information to facilitate backward compatibility of the one or more of the first and second applications.

14. The system of claim 12, wherein the computing device provides the input data storage as feedback to the fuzzing module, wherein the fuzzing module generates additional input data based on the feedback.

15. A non-transitory tangible computer-readable device having instructions stored thereon that, when executed by a computing device, cause the computing device to perform operations comprising:

performing a fuzzing iteration to execute instructions that:

generating input data based on an initial corpus of samples;

communicating the input data to a first application such that the first application performs operations utilizing the input data;

collecting first coverage information from the first application to identify first regressions;

communicating the input data to a second application such that the second application performs operations utilizing the input data; and collecting second coverage information from the second application to identify second regressions;

comparing the first coverage information and the second coverage information;

performing another fuzzing iteration, wherein the computing device is configured to execute instructions that generate input data based on the compared first and second coverage information.

16. The non-transitory tangible computer-readable device of claim 15, wherein the first application is a version of a Representation State Transfer (REST) Application Programming Interface (API) and the second application is another version of the REST API.

17. The non-transitory tangible computer-readable device of claim 15, the operations comprising terminating a fuzzing iteration when a threshold coverage quantity is attained.

18. The non-transitory tangible computer-readable device of claim 15, wherein the first coverage information and/or the second coverage information comprises one or more of the input data, differences between responses, and errors in the logic of one or more of the first and second applications.

19. The non-transitory tangible computer-readable device of claim 15, the operations comprising storing the compared first and second coverage information as input data storage.

20. The non-transitory tangible computer-readable device of claim 19, comprising providing the input data storage as feedback to a fuzzing module, wherein the fuzzing module generates additional input data based on the feedback.

* * * * *